United States Patent [19]

Imai et al.

[11] Patent Number: 4,694,077
[45] Date of Patent: Sep. 15, 1987

[54] NOVEL CELLULOSE DERIVATIVE, PROCESS FOR PREPARING THE SAME AND SULFUR DIOXIDE GAS PERMSELECTIVE MEMBRANE COMPRISING THE SAME

[75] Inventors: Kiyokazu Imai; Tomoo Shiomi; Yasuyuki Tezuka, all of Nagaoka, Japan

[73] Assignee: Shin-Etsu Chemical Co., Ltd., Tokyo, Japan

[21] Appl. No.: 902,625

[22] Filed: Sep. 2, 1986

[30] Foreign Application Priority Data

Aug. 30, 1985 [JP] Japan .................................. 60-191088
Aug. 30, 1985 [JP] Japan .................................. 60-191089
Apr. 25, 1986 [JP] Japan .................................. 61-097682
Apr. 25, 1986 [JP] Japan .................................. 61-097683

[51] Int. Cl.$^4$ ............................................. C08B 11/04
[52] U.S. Cl. ................................. 536/92; 210/500.29
[58] Field of Search ....................... 536/92; 210/500.29

[56] References Cited

FOREIGN PATENT DOCUMENTS

57/207504 12/1982 Japan .

*Primary Examiner*—Joseph L. Schofer
*Assistant Examiner*—Alex H. Walker
*Attorney, Agent, or Firm*—Oblon, Fisher, Spivak, McClelland & Maier

[57] ABSTRACT

Novel cellulose derivative, process for preparing the same and sulfur dioxide gas permselective membrane comprising said derivative.

Hydrocarbysulfinylethyl cellulose represented by the formula (I):

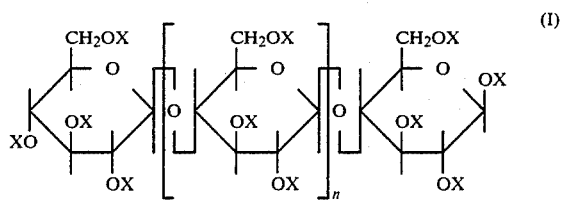

wherein, X may be the same or different and represents hydrogen atom or hydrocarbylsulfinylethyl group represented by the formula (II):

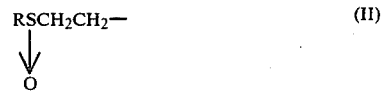

wherein, R may be the same or different and represents an alkyl group having 1 to 6 carbon atoms or a phenyl group, with the average substitution degree with the hydrocarbylsulfinylethyl group of the formula (II) per glucose unit being at least 0.05, and sulfur dioxide gas permeation membrane comprising said cellulose derivative. This membrane is excellent in sulfur dioxide gas permselectivity.

10 Claims, No Drawings

NOVEL CELLULOSE DERIVATIVE, PROCESS FOR PREPARING THE SAME AND SULFUR DIOXIDE GAS PERMSELECTIVE MEMBRANE COMPRISING THE SAME

The present invention relates to a novel cellulose derivative and a sulfur dioxide gas permselective membrane comprising the same, and particularly to hydrocarbylsulfinylethyl cellulose, a process for preparing the same and the sulfur dioxide gas permselective membrane comprising the same.

In the prior art, a polyacetal resin film is known as the sulfur dioxide gas permselective membrane (Japanese Laid-open patent publication No. 207504/1982). However, the polyacetal resin used in the above film has a poor processability due to high crystallinity and it can be formed into a thin film with difficulty. Besides, the film obtained has the problem of lacking practical applicability as a sulfur dioxide gas permselective membrane because of insufficient permeability to sulfur diode gas.

Under such circumstances, an object of the present invention is to provide hydrocarbylsulfinylethyl cellulose which is a novel cellulose derivative and useful as a material for the sulfur dioxide gas permselective membrane and a process for preparing the same.

Another object of the present invention is to supply a novel sulfur dioxide gas permselective membrane having an excellent sulfur dioxide gas permselectivity.

The present invention provides hydrocarbylsulfinylethyl cellulose represented by the formula (I):

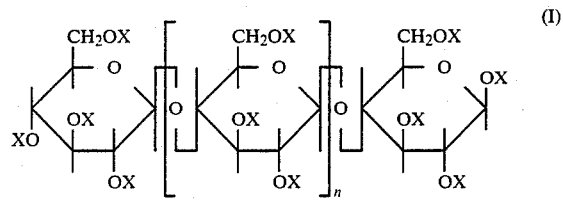

wherein, X may be the same or different and represents hydrogen atom or hydrocarbylsulfinylethyl group represented by the formula (II):

wherein R may be the same or different and represents an alkyl group having 1 to 6 carbon atoms or a phenyl group,
with the average substitution degree with the hydrocarbylsulfinylethyl group of the formula (II) per glucose unit being at least 0.05, and n is an integer representing the repeating number of the glucose units.

The present invention also provides a sulfur dioxide gas permselective membrane comprising the hydrocarbylsulfinylethyl cellulose represented by the above formula (I).

The novel hydrocarbylsulfinylethyl cellulose of the present invention indicates markedly high sulfur dioxide gas permselectivity compared with the conventional cellulose derivatives, for example, cellulose acetate, ethyl cellulose, etc. Accordingly, the sulfur dioxide gas permselective membrane of the present invention can be utilized for separation, purification of sulfur dioxide gas from a gas mixture such as air or for concentration of sulfur dioxide gas in a gas mixture, and is highly practical in industrial use.

More specifically, the sulfur dioxide gas permselective membrane is useful for, for example, removal of harmful sulfur dioxide gas from discharged gases from the viewpoint of environmental protection and purification of starting gases for synthesis, etc. from the viewpoint of industrial production. Further, the hydrocarbylsulfinylethyl cellulose of the present invention is useful for a thickening agent, binder, protective colloidal agent, etc.

In the present specification, the average substitution degree with the hydrocarbylsulfinylethyl group means an average number of the hydrocarbylsulfinylethyl groups existing per glucose unit (i.e. anhydrous glucose ring). In hydrocarbylsulfinylethyl cellulose represented by the formula (I) of the present invention, the average substitution degree with the hydrocarbylsulfinylethyl group is at least 0.05. With said substitution degree less than 0.05, the special functionality such as sulfur dioxide gas permselectivity, etc. is insufficient.

On the other hand, in the case where the hydrocarbyl group, R, in the formula (II) is an alkyl group having 1 to 6 carbon atoms, for example, methyl, ethyl, propyl, butyl, pentyl or hexyl, the above-mentioned average substitution degree is preferably 0.6 or more. With a substitution degree of 0.6 or more, the alkylsulfinylethyl cellulose is water-soluble, and therefore has the advantage that it can be fabricated into a film with ease according to the casting method from its aqueous solution. Further, in the case where R is a phenyl group, the above-mentioned average substitution degree is preferably 0.3 or more. With a substitution degree of 0.3 or more, the phenylsulfinylethyl cellulose has good solubility in a solvent such as dimethyl sulfoxide, etc., and therefore has the advantages that it can be fabricated into a film with ease according to the casting method from its solution, and that, in addition, the phenylsulfinylethyl cellulose can be used as a thickening agent, binder, protective colloidal agent, etc.

The hydrocarbylsulfinylethyl cellulose of the present invention can be prepared by allowing cellulose to react with hydrocarbyl vinyl sulfoxide represented by the formula (III):

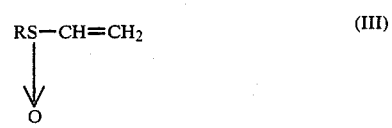

wherein R has the same meaning as defined above, in the presence of an alkali catalyst.

The cellulose used is not particularly limited, but, for example, natural cellulose such as cotton linter, chemical wood pulp and the like, various regenerated cellulose, crystalline cellulose, etc. can be used.

On the other hand, hydrocarbyl vinyl sulfoxide used in the above preparation method can be synthesized, for example, through the reaction steps shown by the following reaction schemes:

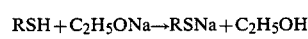

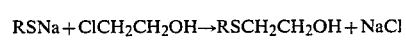

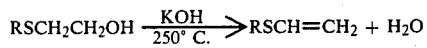

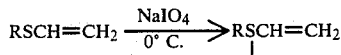

More specifically, sodium thiolate obtained from the reaction of alkylmercaptan or phenylmercaptan with sodium ethoxide in ethanol at room temperature is allowed to react with ethylene chlorohydrine to synthesize hydroxyethyl hydrocarbyl sulfide. Then, the hydroxyethyl hydrocarbyl sulfide is subjected to dehydration at 250° C. in the presence of potassium hydroxide to be converted to vinyl hydrocarbyl sulfide, which is oxidized at 0° C. in an aqueous sodium metaperiodate solution, whereby hydrocarbyl sulfoxide of the formula (III) can be synthesized.

Examples of the alkali catalyst to be used in the above preparation method include sodium hydroxide, potassium hydroxide, sodium carbonate, potassium carbonate and the like, but is is generally economically advantageous to use sodium hydroxide.

The above method for preparation of hydrocarbylsulfinylethyl cellulose may be generally practiced by carrying out the reaction of the both reactants under stirring in an aqueous solution containing the alkali catalyst at a concentration of 5 to 40% by weight at 10° to 50° C. (usually, room temperature is satisfactory). Generally, hydrocarbyl vinyl sulfoxide in the range of from 0.1 to 50 mols is used per 1 mol of glucose units in the cellulose, and the reaction is carried out so that a hydrocarbylsulfinylethyl cellulose having a desired average substitution degree with hydrocarbylsulfinylethyl groups may be obtained. After completion of the reaction, the reaction mixture is neutralized with acetic acid and the like, and then poured into, for example, a solvent mixture of acetone/methanol to precipitate the product. Subsequently, the operation of dissolving the product thus obtained in a good solvent followed by precipitation in the acetone/methanol solvent mixture can be repeated to purify the product. As the good solvent, dimethyl sulfoxide can be used, and if the hydrocarbyl group R is an alkyl group, water can also be used.

When the thus obtained hydrocarbylsulfinylethyl cellulose of the present invention is subjected to proton nuclear magnetic resonance ($^1$H-NMR) spectral analysis, the spectra varied in accordance with the substitution with the hydrocarbylsulfinylethyl group can be observed. More specifically, when the alkylsulfinylethyl cellulose derivative, in which the hydrocarbyl group R of the formula (II) is an alkyl group, is dissolved in heavy water and is subjected to proton nuclear magnetic resonance spectral analysis, absorption due to the protons of the hydroxy groups of cellulose is reduced, and absorption due to protons of the alkyl group which originates from alkyl vinyl sulfoxide can be recognized at 3.1 ppm. On the other hand, no signal due to protons of the vinyl group of alkyl vinyl sulfoxide can be recognized. Further, the phenylsulfinylethyl cellulose, in which the hydrocarbyl group R is a phenyl group, is dissolved in dimethyl sulfoxide in which hydrogen atoms are deuterium (D) (hereinafter referred to as "deutero DMSO"), absorption due to protons of the hydroxy groups of cellulose used as a starting material is reduced, and absorption due to protons of the phenyl group which originates from phenyl vinyl sulfoxide can be recognized at around 7.5 ppm. On the other hand, no signal due to protons of the vinyl group of phenyl vinyl sulfoxide which is the other starting material can be recognized.

The above facts indicate that the hydroxy groups of cellulose undergo addition reaction with the vinyl group of alkyl vinyl sulfoxide or phenyl vinyl sulfoxide, whereby alkylsulfinylethyl group or phenylsulfinylethyl group is introduced to give the hydrocarbylsulfinylethyl cellulose of the formula (I).

The hydrocarbylsulfinylethyl cellulose of the present invention exhibits the spectral characteristics in $^1$H-NMR spectral analysis and $^{13}$C-NMR spectral analysis as given below.

Alkylsulfinylethyl cellulose $^1$HNMR(D$_2$O) δ ppm;  4.0-4.2 (m, —OCH$_2$CH$_2$SR), 

3.4-3.7 (m, —OCH$_2$CH$_2$SR), 

$^{13}$CNMR(D$_2$O) δ ppm;  62-65 (—OCH$_2$CH$_2$SR), 

52-55 (—OCH$_2$CH$_2$SR), 

Phenylsulfinylethyl cellulose $^1$H—NMR(deutero-DMSO) δ ppm;  2.8-3.0 (m, —OCH$_2$CH$_2$SC$_6$H$_5$) 

7.4-7.6 (m, —OCH$_2$CH$_2$SC$_6$H$_5$) 

$^{13}$C—NMR(deutero-DMSO) δ ppm;  60 (—OCH$_2$CH$_2$SC$_6$H$_5$) 

128-148 (—OCH$_2$CH$_2$SC$_6$H$_5$) 

For obtaining the sulfur dioxide gas permselective membrane of the present invention by fabricating the hydrocarbylsulfinylethyl cellulose into a film, a coated film is formed from a solution thereof in an appropriate solvent according to the method such as coating on a smooth surface, etc., or coating on a porous substrate, etc., followed by removal by drying of the solvent. An example of the solvent used may be dimethyl sulfoxide.

In the case where the alkylsulfinylethyl cellulose is used for preparing a film, examples of the solvent used may include acetone, water, etc. in addition to dimethyl sulfoxide. If the alkylsulfinylethyl cellulose has an average substitution degree of 0.6 or more, water can be used suitably. If the phenylsulfinylethyl cellulose has an average substitution degree of 0.3 or more, it has particularly high solubility in dimethyl sulfoxide and therefore has good handling and coating characteristics.

The present invention is described in more detail with reference to the following examples.

EXAMPLES

Example 1

After 5.0 g of a crystalline cellulose (trade name: Abicell PH 101, produced by Asahi Kasei Kogyo K.K.) was added to 100 ml of an aqueous 20 wt.% sodium hydroxide, methyl vinyl sulfoxide was added in an amount so that the molar ratio relative to the glucose units possessed by the cellulose was 9.0. After the reaction was carried out by stirring the mixture at room temperature for one hour, the reaction mixture was neutralized with acetic acid. The mixture obtained was poured into a solvent mixture of acetone/methanol (volume ratio 7/3) to precipitate the reaction product. Subsequently, the operation of dissolving the product in water followed by precipitation in the same acetone/methanol solvent mixture as used above was repeated several times to purify the product. The sulfur content of the methylsulfinylethyl cellulose obtained was measured by elemental analysis to determine the average substitution degree with methylsulfinylethyl groups. The results are shown in Table 1.

Examples 2 to 6

Methylsulfinylethyl celluloses were prepared and purified in the same manner as in Example 1 except for varying the amount of methyl vinyl sulfoxide used and the reaction time as shown in Table 1. The sulfur contents and average substitution degree with methylsulfinylethyl groups of the methylsulfinylethyl celluloses obtained were determined similarly as in Example 1. The results are shown in Table 1.

TABLE 1

| | Methyl vinyl sulfoxide/glucose units (molar ratio) | Reaction time (Hr) | Sulfur content (wt %) | Average substitution degree with methylsulfinylethyl group |
|---|---|---|---|---|
| Example 1 | 9.0 | 1 | 4.60 | 0.27 |
| Example 2 | 9.0 | 3 | 9.50 | 0.67 |
| Example 3 | 9.0 | 5 | 10.45 | 0.77 |
| Example 4 | 9.0 | 9 | 11.22 | 0.83 |
| Example 5 | 27.4 | 9 | 14.15 | 1.18 |
| Example 6 | 35.7 | 9 | 14.50 | 1.23 |

$^1$H-NMR and $^{13}$C-NMR spectra of the methylsulfinylethyl cellulose obtained in Examples 5 (average substitution degree 1.18) was measured to give the results as shown below.

$^1$H-NMR (D$_2$O)

δ (ppm): 3.10(s, (j)), 3.47–3.60(m, (i)), 3.75(m, (e)), 4.02–4.07(m, (h)), 4.05–4.10(m, (f)), 4.25(m, (c)), 4.35(m, (b)), 4.55(m, (d)), 4.55(m, (a)), 4.81(s, (g)), In this case, (a) to (j) each indicate protons shown in the following glucose units.

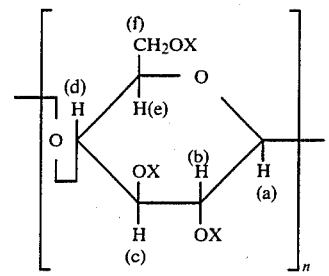

where X is

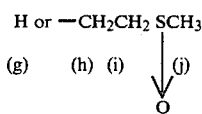

$^{13}$C-NMR (D$_2$O)

δ (ppm): 37.0(9), 53.0(8), 64.0(7), 66.0(6), 73.0(2), 74.0(3), 78.5(5), 82.0(4), 102.0(1)

In this case, (1) to (9) each indicate carbon atoms shown in the following glucose units.

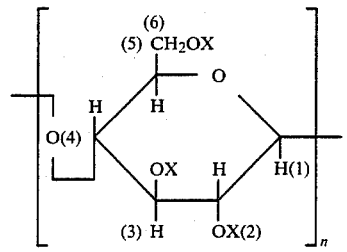

where X is H or

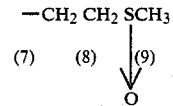

Example 7

An aqueous solution containing 15 wt.% of methylsulfinylethyl cellulose obtained in Example 4 was casted on a glass plate having smooth surface and dried to obtain a film with a thickness of 81 μm. The gas permeation coefficients (P) of oxygen gas, nitrogen gas, carbon dioxide gas and sulfur dioxide gas of this film under 2 atm. were measured by use of a gas permeability measuring device based on the volume method (S. A. Stern, J. Appl. Polym. Sci., 7, 2035 (1963)), and the permeation coefficient ratios of sulfur dioxide gas relative to other gases were determined. The results are shown in Table 2.

Example 8

After 5.0 g of a crystalline cellulose (trade name: Abicell PH 101, produced by Asahi Kasei Kogyo K.K.) was added to 100 ml of an aqueous 10 wt.% sodium hydroxide, ethyl vinyl sulfoxide was added in an amount so that the molar ratio relative to the glucose units possessed by the cellulose was 9.0. After the reaction was carried out at room temperature for 9 hours, the reaction mixture was neutralized with acetic acid. Then, operation of purification was done similarly as in Example 1. The measurement of sulfur content of the ethylsulfinylethyl cellulose obtained and the determinations of the average substitution degree with ethylsulfinylethyl groups were done similarly as in Example 1. Also, a film with a thickness of 90 μm was produced similarly as in Example 7 and the gas permeability were measured. These results are shown in Table 2.

Example 9

After 5.0 g of a powdery wood pulp was added to 200 ml of an aqueous 20 wt.% sodium hydroxide, n-propyl vinyl sulfoxide was added in an amount so that the molar ratio relative to the glucose units possessed by the glucose was 9.0. After the reaction was carried out at room temperature for 9 hours, the reaction mixture was neutralized with acetic acid. Subsequent purification was conducted similarly as in Example 1. The sulfur content of the n-propylsulfinylethyl cellulose obtained, the average substitution degree with n-propylsulfinylethyl groups and the gas permeability of the film formed with a thickness of 100μ were measured. The results are shown in Table 2.

Example 10

A t-butylsulfinylethyl cellulose was prepared in the same manner as in Example 9 except for using t-butyl vinyl sulfoxide in place of n-propyl vinyl sulfoxide. The sulfur content of the t-butylsulfinylethyl cellulose obtained, the average substitution degree and the gas permeability of a film formed with thickness of 90μ were measured similarly as in Example 1. The results are shown in Table 2.

Example 11

An n-hexylsulfinylethyl cellulose was prepared in the same manner as in Example 9 except for using n-hexyl vinyl sulfoxide in place of n-propyl vinyl sulfoxide. The sulfur content, the average substitution degree of the n-hexylsulfinylethyl cellulose obtained and the gas permeability of the film formed with a thickness of 85 μm were determined similarly as in Example 1. The results are shown in Table 2.

Comparative example 1

Using a commercially available ethyl cellulose (average substitution degree with ethyl groups: 2.5, viscosity: 80–120 cps at 25° C., produced by Nakai Kagaku), a film with a thickness of 127 μm was formed. The gas permeability of the film obtained was determined similarly as in Example 1. The results are shown in Table 2.

Example 12

(1) Preparation of phenylsulfinylethyl cellulose

After 5.0 g of a crystalline cellulose (trade name: Abicell PH 101, produced by Asahi Kasei Kogyo K.K.) was added to 100 ml of an aqueous 10 wt.% sodium hydroxide, phenyl vinyl sulfoxide was added in an amount so that the molar ratio relative to the glucose units possessed by the cellulose was 9.0. After the reaction was carried out by stirring the mixture at room temperature for one hour, the reaction mixture in a slurry was neutralized with acetic acid. Next, the mixture obtained was poured into a solvent mixture of acetone/methanol (volume ratio 8/2) to precipitate the reaction product. Subsequently, the operation of dissolving and dispersing the product in dimethyl sulfoxide followed by precipitation in the same acetone/methanol solvent mixture as used above was repeated several times to purify the product.

The sulfur content of the phenylsulfinylethyl cellulose obtained was measured by elemental analysis to determine the average substitution degree with phenylsulfinylethyl groups. The results are shown in Table 3.

$^1$H-NMR and $^{13}$C-NMR spectra of the phenylsulfinylethyl cellulose obtained (substitution degree 0.73) were measured to give the results as shown below.

$^1$H-NMR (deutero-DMSO)

δ ppm; 2.8–3.0(m, (i)), 3.3–4.7(m, (a)(b)(c)(d)(e)(f)(h)), 5.2(s, (g)), 7.4–7.6(m, (j))

In this case, (a) to (j) each indicate protons shown in the following glucose units.

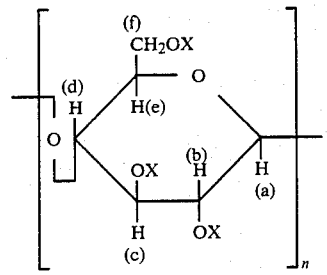

where X is

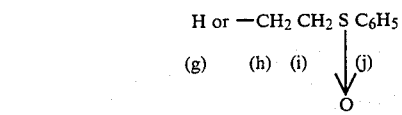

$^{13}$C-NMR (deutero-DMSO)

TABLE 2

|  | Sulfur content (%) | Average substitution degree | Gas permeation coefficient p × 10$^{-10}$ cm$^3$ (STP) · cm/cm$^2$ · sec · cmHg | | | | Gas permeation coefficient ratio | | |
|---|---|---|---|---|---|---|---|---|---|
|  |  |  | P(N$_2$) | P(O$_2$) | P(CO$_2$) | P(SO$_2$) | P(SO$_2$)/P(N$_2$) | P(SO$_2$)/P(O$_2$) | P(SO$_2$)/P(CO$_2$) |
| Example 7 | 11.22 | 0.83 | 0.16 | 0.38 | 0.36 | 356 | 2200 | 940 | 990 |
| Example 8 | 8.55 | 0.60 | 0.20 | 0.53 | 0.56 | 1120 | 5600 | 2100 | 2000 |
| Example 9 | 9.98 | 0.80 | 0.29 | 0.53 | 0.58 | 1850 | 6300 | 3500 | 3200 |
| Example 10 | 8.96 | 0.72 | 0.28 | 0.47 | 0.38 | 3360 | 12000 | 7200 | 8900 |
| Example 11 | 8.64 | 0.70 | 0.25 | 0.34 | 0.31 | 2225 | 8900 | 6600 | 7200 |
| Comparative Example 1 | — | — | 3.1 | 14.2 | 93.4 | 2140 | 690 | 150 | 23 |

δ (ppm): 60((8)), 66–68((6), (7)), 72–78((4), (5)), 82–86((2), (3)), 104–106((1)), 128((10)), 132((11)), 134((12)), 148((9))

In this case, (1) to (12) each indicate carbon atoms shown in the following glucose units.

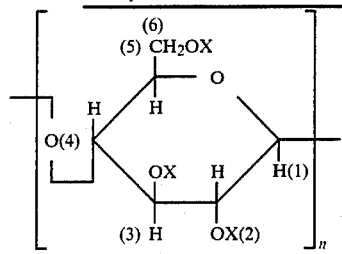

where X is H or

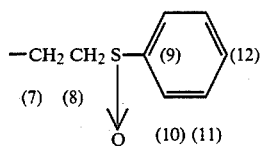

(2) Preparation of sulfur dioxide gas permselective membrane

A 15 wt.% dimethyl sulfoxide solution of the phenylsulfinylethyl cellulose obtained in (1) was casted on a glass plate having smooth surface and dried to obtain a film with a thickness of 92 μm. The gas permeation coefficients (P) of oxygen gas, nitrogen gas, carbon dioxide gas and sulfur dioxide gas of this film under 1 atm. were measured similarly as in Example 7, and the permeation coefficient ratios of sulfur dioxide gas relative to other gases were determined. The results are shown in Table 3.

Examples 13 and 14

Phenylsulfinylethyl celluloses were prepared in the same manner as in Example 12(1) except for changing the amount of phenyl vinyl sulfoxide used as shown in Table 3. The sulfur contents and average substitution degrees with phenylsulfinylethyl groups of the phenylsulfinylethyl celluloses obtained were determined similarly as in Example 1. The $^1$H-NMR and $^{13}$C-NMR spectra of the phenylsulfinylethyl celluloses obtained were found to be the same as in Example 12.

Films with a thickness of 92 μm were prepared in the same manner as in Example 12 using the phenylsulfinylethyl celluloses obtained, and the gas permeability thereof were measured. The results are shown in Table 3.

Comparative example 2

A 15 wt.% methylene chloride solution of a commercially available ethyl cellulose (average substitution degree with ethyl groups: 2.5, viscosity: 80–120 cps, produced by Nakai Kagaku) was casted on a glass plate having smooth surface and dried to mold a film with a thickness of 127 μm, and its gas permeability was measured similarly as in Example 12. The results are shown in Table 3.

TABLE 3

|  | Sulfur content (%) | Average substitution degree | Gas permeation coefficient p × $10^{-10}$ cm$^3$ (STP) · cm/cm$^2$ · sec · cmHg | | | | Gas permeation coefficient ratio | | |
|---|---|---|---|---|---|---|---|---|---|
|  |  |  | P(N$_2$) | P(O$_2$) | P(CO$_2$) | P(SO$_2$) | P(SO$_2$)/P(N$_2$) | P(SO$_2$)/P(O$_2$) | P(SO$_2$)/P(CO$_2$) |
| Example 12 | 8.56 | 0.73 | 0.05 | 0.10 | 0.26 | 3540 | 71000 | 35000 | 14000 |
| Example 13 | 6.87 | 0.51 | 0.04 | 0.08 | 0.25 | 2790 | 70000 | 35000 | 11000 |
| Example 14 | 5.40 | 0.36 | 0.04 | 0.07 | 0.23 | 2350 | 59000 | 34000 | 10000 |
| Comparative Example 2 | — | — | 1.10 | 4.70 | 31.0 | 1010 | 920 | 220 | 33 |

We claim:
1. A hydrocarbylsulfinylethyl cellulose represented by the formula (I):

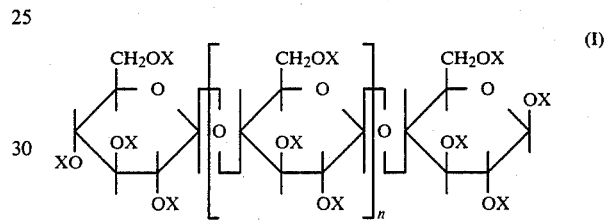

wherein X may be the same or different and represents hydrogen atom or hydroxycarbylsulfinylethyl group represented by the formula (II):

wherein R may be the same or different and represents an alkyl group having 1 to 6 carbon atoms or a phenyl group,
with the average substitution degree with the hydrocarbylsulfinylethyl group of the formula (II) per glucose unit being at least 0.05, and n is an integer representing the repeating number of the glucose units.

2. The hydrocarbylsulfinylethyl cellulose according to claim 1, wherein R in the formula (II) represents an alkyl group having 1 to 6 carbon atoms and the average substitution degree is 0.6 or more.

3. The hydrocarbylsulfinylethyl cellulose according to claim 1, wherein R in the formula (II) represents phenyl group and the average substitution degree is 0.3 or more.

4. A process for preparing the hydrocarbylsulfinylethyl cellulose represented by the above formula (I) by allowing a cellulose to react with hydrocarbyl vinyl sulfoxide represented by the formula (III):

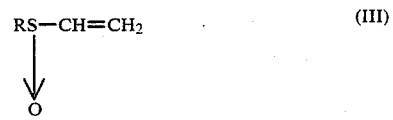

wherein R has the same meaning as defined in the above formula (II), in the presence of an alkali catalyst.

5. The process according to claim 4, wherein the above reaction is carried out at 10° to 50° C. in an aqueous solution containing 5 to 40 wt.% of the alkali catalyst.

6. The process according to claim 4, wherein the cellulose is selected from the group consisting of natural celluloses, crystalline celluloses and regenerated celluloses.

7. The process according to claim 4, wherein the alkali catalyst is sodium hydroxide, potassium hydroxide, sodium carbonate or potassium carbonate.

8. A sulfur dioxide gas permselective membrane comprising hydrocarbysulfinylethyl cellulose represented by the formula (I):

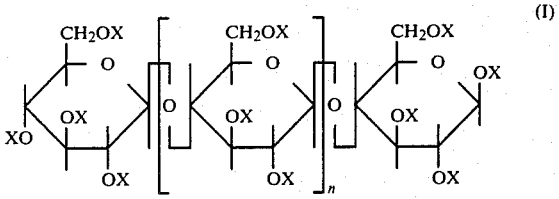

wherein, X may be the same or different and represents hydrogen atom or hydrocarbylsulfinylethyl group represented by the formula (II):

wherein, R may be the same or different and represents an alkyl group having 1 to 6 carbon atoms or a phenyl group,
with the average substitution degree with the hydrocarbylsulfinylethyl group of the formula (II) per glucose unit being at least 0.05, and n is an integer representing the repeating number of the glucose units.

9. The sulfur dioxide gas permselective membrane according to claim 8, wherein R in the formula (II) is an alkyl group having 1 to 6 carbon atoms and the average substitution degree is 0.6 or more.

10. The sulfur dioxide gas permselective membrane according to claim 8, wherein R in the formula (II) is phenyl group and the average substitution degree is 0.3 or more.

* * * * *